US010769586B2

(12) United States Patent
Savage et al.

(10) Patent No.: US 10,769,586 B2
(45) Date of Patent: Sep. 8, 2020

(54) IMPLEMENTATION OF ROLLING KEY TO IDENTIFY SYSTEMS INVENTORIES

(71) Applicant: Red Hat, Inc., Raleigh, NC (US)

(72) Inventors: Peter Savage, Southampton (GB); Jason Frey, Cedar Knolls, NJ (US)

(73) Assignee: Red Hat, Inc., Raleigh, NC (US)

(*) Notice: Subject to any disclaimer, the term of this patent is extended or adjusted under 35 U.S.C. 154(b) by 98 days.

(21) Appl. No.: 16/205,008

(22) Filed: Nov. 29, 2018

(65) Prior Publication Data

US 2020/0175460 A1 Jun. 4, 2020

(51) Int. Cl.
G06Q 10/00 (2012.01)
H04L 9/08 (2006.01)
G06F 15/16 (2006.01)
G06Q 10/08 (2012.01)
G06Q 30/04 (2012.01)

(52) U.S. Cl.
CPC .......... *G06Q 10/087* (2013.01); *G06Q 30/04* (2013.01)

(58) Field of Classification Search
None
See application file for complete search history.

(56) References Cited

U.S. PATENT DOCUMENTS

| 6,463,154 B1 | 10/2002 | Patel |
| 8,224,976 B2 | 7/2012 | Jiang et al. |
| 8,347,376 B2 | 1/2013 | Weis et al. |
| 2008/0244028 A1* | 10/2008 | Le .......................... G06F 3/0607 709/208 |
| 2010/0106771 A1* | 4/2010 | Park ....................... G06F 15/16 709/203 |
| 2012/0300940 A1* | 11/2012 | Sabin ...................... H04L 63/06 380/282 |
| 2013/0312119 A1* | 11/2013 | Fischer ............ H04N 21/42684 726/32 |
| 2014/0245420 A1 | 8/2014 | Tidwell et al. |
| 2018/0113999 A1* | 4/2018 | Azmat ................ G06F 9/45533 |

FOREIGN PATENT DOCUMENTS

WO 2013059866 5/2013

* cited by examiner

*Primary Examiner* — Ariel J Yu
(74) *Attorney, Agent, or Firm* — Lowenstein Sandler LLP

(57) ABSTRACT

Disclosed are systems and methods for implementation of a rolling key to identify systems inventories. One method may include receiving, by a processing device of an inventory server from a client system, a key and a key component, wherein the key component comprises a random string of characters generated by the client system to uniquely identify the client system; identifying, using the key as an identifier, the client system in an inventory database of the inventory server; transmitting an acknowledgement to the client system that the client system has been identified in the inventory database and that the inventory server received the key component, the acknowledgement to cause the client system to store the key component as part of a new key used to identify the client system; and storing the key component, wherein storing the key component causes a modification of the key used to identify the client system.

20 Claims, 11 Drawing Sheets

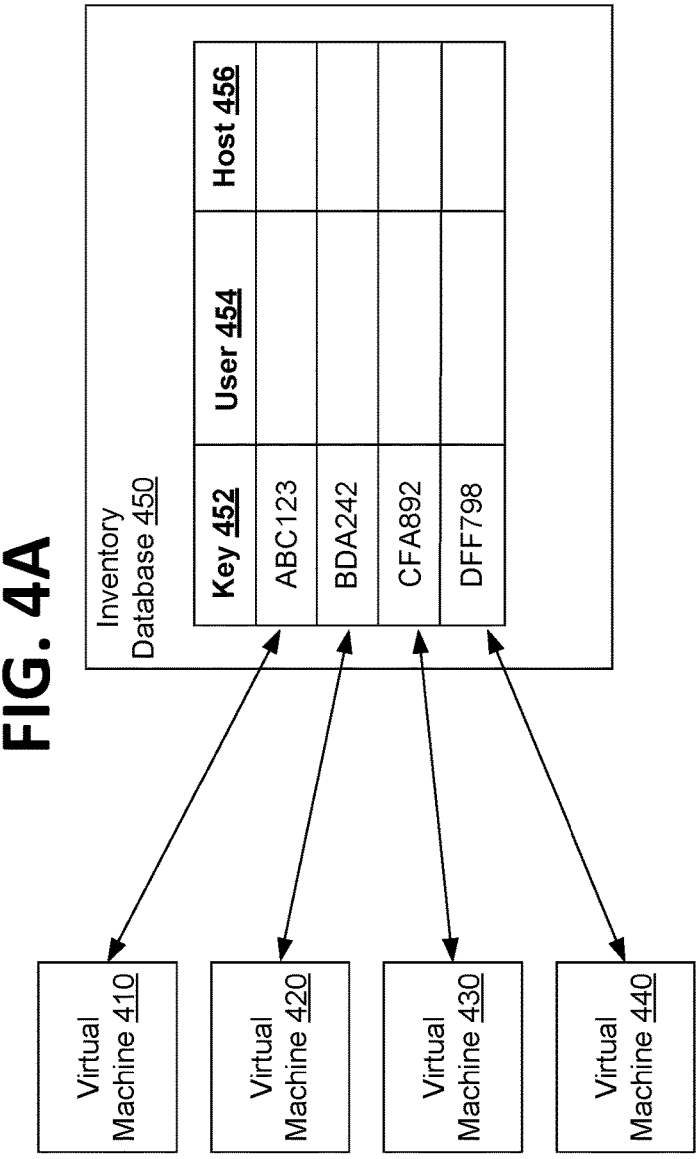

IMPLEMENTATION OF ROLLING KEY TO IDENTIFY SYSTEMS INVENTORIES

TECHNICAL FIELD

The present disclosure is generally related to computer systems, and more particularly, to identifying computer systems in a systems inventory.

BACKGROUND

Systems inventories are used to identify systems executing within a computing environment. Such identification may enable features such as billing and metering of systems executing in the computing environment. Examples of computing environments may include, but are not limited to, a virtual infrastructure, public cloud environments, private cloud environments, hybrid cloud environments, containers, software-defined networks, software-defined storage, middleware and its applications, and physical datacenters.

When a client computer system communicates with an inventory server an identification of the communicating client system may be requested for any number of environment management tasks. Such environment management tasks may include providing a self-service portal and capabilities for granular permission for user access, metering and billing for chargeback and showback, ability to provision new instances and applications for an application catalog or from image templates, integration points with existing system management, service catalogs, and configuration management software, and an ability to control and automate the placement and provisioning of new instances based on business and security policies. An inventory server can maintain an inventory to identify the client systems executing within the computing environment.

BRIEF DESCRIPTION OF THE DRAWINGS

The disclosure is illustrated by way of example, and not by way of limitation, and can be more fully understood with reference to the following detailed description when considered in connection with the figures in which:

FIG. 4A depicts an example inventory system database using rolling keys to identify client systems according to one implementation.

FIG. 4B depicts an example key component list comprising a number of previous key components and a new key component according to one implementation.

DETAILED DESCRIPTION

Figure 1:
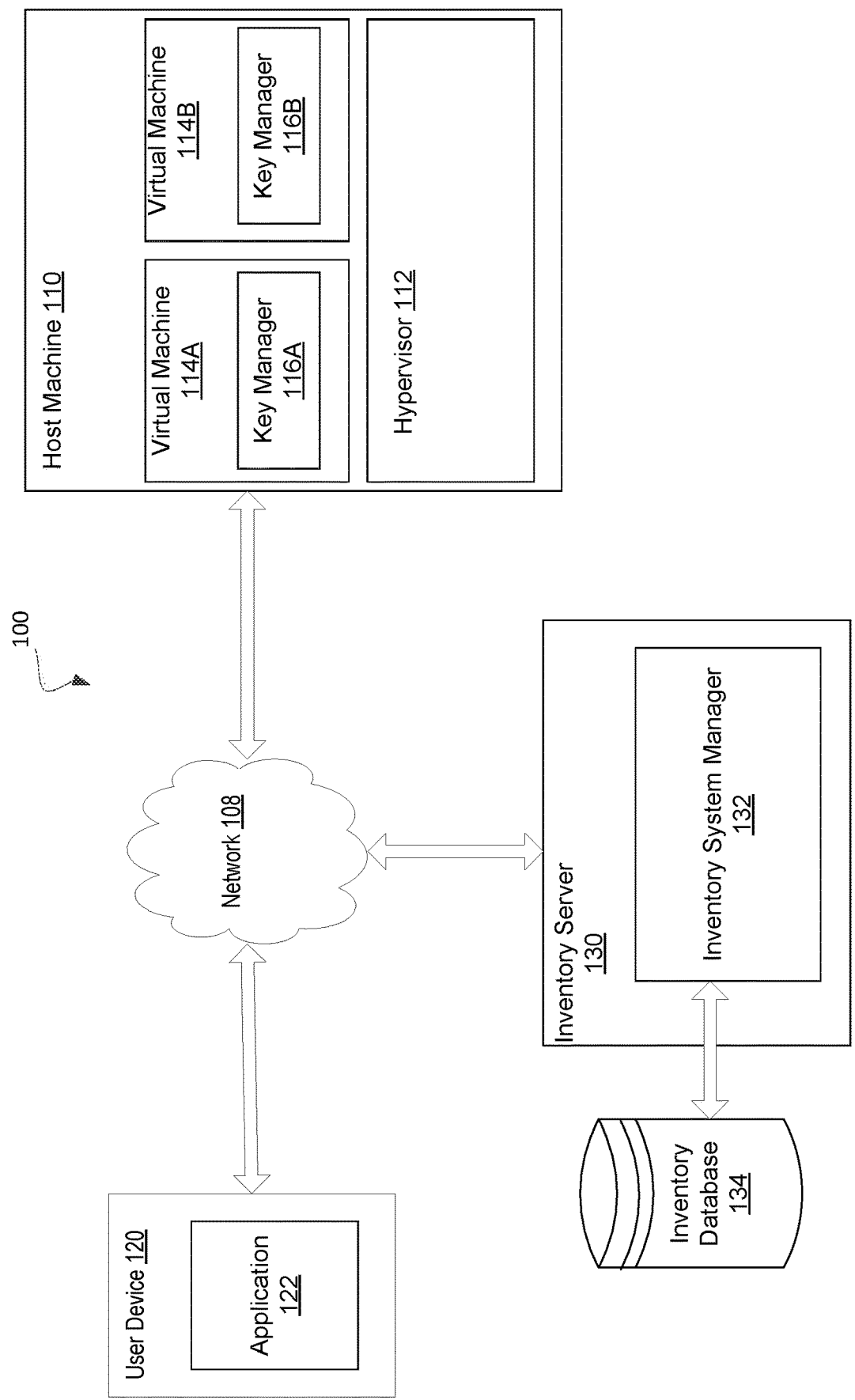
FIG. 1 depicts a system diagram of an example computer system architecture, in accordance with one or more aspects of the disclosure.

Described herein are methods and systems for implementing a rolling key to identify systems inventories. In a systems inventory a key may be used by an inventory server to identify computer systems communicating with the inventory server from a computing environment. A computer system, such as a virtual machine, communicating with the inventory server, may be referred to as a client system. A key may refer to a string of alphanumeric characters that may be used by the inventory server to identify and authenticate a client system.

The key associated with a client system may be stored in an inventory database of the inventory server. A unique key associated with a client system may be based on hardware keys of the hardware on which the client system is executing. In conventional systems, keys based on hardware keys may become outdated as hardware changes, such as when a virtual client system migrates to another physical machine or when hardware is replaced. A key may also be randomly-generated and stored to a disk of a client system. Each client system may store its associated key on a disk of the client system. However, if such a client system is cloned (i.e., the disk of the client system is copied to create an identical client system), then the cloned client system may store the same key as generated by the original client system from which it was cloned. As a result, the key is no longer unique, creating a duplicate system in the inventory. The two client systems may then be acted upon as if they were a single machine. Other issues may arise from duplicate clients systems interfering with environment management tasks associated with systems inventories.

Aspects of the disclosure address the above-noted issues of conventional systems associated with using a static key to identify client systems executing within a computing environment. In one implementation of the disclosure, a rolling key may be used to cause each client system to be assigned a unique key. When a client system communicates with an inventory server, the client system may generate a random string of characters referred to as a key component. The client system may then send a communication to the inventory server, where the communication includes the client system's current key (if one exists) and the randomly-generated key component. After receiving the communication with the key and key component, the server may identify the client system using the key (if a record of the client system already exists in the inventory). The server may then send an acknowledgment to the client system that the key component was received. The client system may store the key component as part of a new key to identify the client system. The server may then also store the key component as part of the new key to identify the client system. Storing the key component as part of the new key may include storing the key component as the sole key component of the new key or as part of a plurality of key components that together define the new key.

In another example, when a client system communicates with an inventory server, the client system may generate a key component. If the client system has been newly created, the client system may send a communication to the server, where the communication includes the key component but does not include a key identifying the client system (as the client system is newly created). The server may send an acknowledgment of receipt of the key component and a notification that the client system could not be identified in the inventory server. The inventory server may then create a new record for the client system and store the key component as the key to identify the new client system. The client system may also store the key component as the key to identify the client system.

The systems and methods described herein include technology that enhances systems management technology of a computer system. In particular, aspects of the disclosure provide technology that provides enhances in reliability and consistency of system identification and system authentication in a computing environment. The technology may enable inventory systems to identify and differentiate between client systems even when multiple client systems have been created from the same disk. The technology may further enable inventory systems to identify systems more consistently even when changes occur in the physical hardware on which a client system is executing. This may enhance accuracy of identification of systems in a virtual computing environment, preventing duplicate systems and enabling more precise billing and metering of virtual machines executing in the virtual computing environment, or any other computing environment.

FIG. 1 depicts a system diagram of an example network computer system 100 in which examples of the disclosure may operate. It should be noted that other architectures for network computer system 100 are possible, and that the implementation of a network computer system utilizing examples of the disclosure are not limited to the specific architecture depicted.

The example network computer system 100, shown in FIG. 1, may include a host machine 110, an inventory server 130, and a user device 120 connected by a network 108. One or more virtual machines 114A-B may run on the host machine 110. Hypervisor 112 may run on the host machine 110 and manage virtual machines 114A-B. Inventory system manager 132 may run on inventory server 130. Inventory system manager 132 may be coupled to an inventory database 134. Although the below description of FIG. 1 refers to a virtual machine, it should be noted that the disclosure may include any computer system operating within a computing environment. Any computer system that communicates with the inventory server may be referred to as a client system. Therefore, the description below, in reference to a virtual machine, may apply to any client system operating within a computing environment.

Host machine 110 may be a server, a workstation, a personal computer, a mobile phone, a palm-sized computing device, a personal digital assistant, etc. Host machine 110 may include a system comprising one or more processors, one or more memory devices, and one or more input/output interfaces. Host machine 110 may execute, or run, one or more virtual machines 114A-B by executing a software layer referred to as hypervisor 112 on the host machine. Hypervisor 112 may manage virtual machine resources and access control. Virtual machines 114A-B may include a key manager 116A-B for generating and storing key components and keys used to identify virtual machines 114A-B.

When a virtual machine 114A-B communicates with the inventory server 130, a rolling key may be used to uniquely identify the virtual machine 114A-B. For example, when communicating with the inventory server 130, key manager 116A may generate a random string of characters referred to as a key component. The key manager 116A may provide a key component and a key identifying virtual machine 114A in a communication to the inventory system manager 132. In response, the inventory system manager 132 may send an acknowledgement to virtual machine 114A that the communication and the key component were received. The acknowledgement may include the key component and the key that were received by the inventory system manager 132. Once the key manager 116A of virtual machine 114A receives the acknowledgment, key manager 116A may store the key component as part of the new key used to identify virtual machine 114A. The key manager 116A may store the key component after confirming that the key component included in the acknowledgment is the same key component that was originally generated and sent by the key manager 116A.

In another example, when inventory server 130 receives a communication from virtual machine 114A, inventory system manager 132 may identify if the communication includes a key and a key component. If the communication includes a key component the inventory system manager 132 may send an acknowledgment that the key component was received by the inventory server 130. The acknowledgement may include the key component that the inventory system manager 132 received from key manager 116A. After sending the acknowledgement, the inventory system manager 132 may store the key component in the inventory database 134 as the new key used to identify virtual machine 114A. The inventory system manager 132 may store the key component after receiving an indication from the key manager 116A that the acknowledgement included the same key component that was originally generated by key manager 116A.

In the same or different example, if the communication does not include a key, virtual machine 114A may be a newly-created virtual machine. For newly-created virtual machines, the inventory system manager 132 may create a new record in the inventory database 134 for virtual machine 114A and store the key component as the key to identify virtual machine 114A. If the communication includes a key but the key is not associated with a virtual machine in the inventory system, then virtual machine 114A may be a cloned machine. Inventory system manager 132 may create a new record in the inventory database 134 for virtual machine 114A and store the key component as the new key to identify virtual machine 114A. The inventory system manager 132 may store the key component after receiving an indication from the key manager 116A that the acknowledgement included the same key component that was originally-generated by key manager 116A.

Inventory system manager 132 may store, in an inventory database 134, a key identifying a virtual machine 114A-B executing within a computing environment. For example, a first key stored in key database 134 may uniquely identify virtual machine 114A and a second key stored in key database 134 may uniquely identify virtual machine 114B. Inventory system manager 132 may also store, in the inventory database 134, a list of key components associated with a virtual machine. The list of key components may be referred to as a key component list. For example, a key component list stored in inventory database 134 may include a first key component used to identify virtual machine 114A and one or more additional key components that have previously been used to identify virtual machine 114A. As discussed in more detail with FIG. 4B, a combination of multiple key components of the key component list may be used as the key to identify a virtual machine.

A user device 120 may be connected to the network. User device 120 may be a server, a workstation, a personal computer, a mobile phone, a palm-sized computing device, a personal digital assistant, and so on. User device 120 may execute an application 122. User device 120 may communicate with and control a virtual machine 114A-B through application 122. Inventory system manager 132 may maintain a record of the user device associated with a virtual machine 114A-B. For example, user device 120 may be associated with virtual machine 114B. User device 120 may be able to control virtual machine 114B via application 122. Inventory system manager 132 may store, in inventory database 134, an association between virtual machine 114B and user device 120. Thus, the inventory system manager 132 may identify a user device 120 of a virtual machine 114A-B.

Network 108 may be a public network (e.g. the internet), a private network (e.g. a local area network (LAN) or a wide area network (WAN)), or a combination thereof. In one example, network 108 may include a wired or a wireless infrastructure, which may be provided by one or more wireless communications systems, such as a wireless fidelity (WiFi) hotspot connected with the network 108 and/or a wireless carrier system that can be implemented using various data processing equipment, communication towers, etc.

Figure 2:
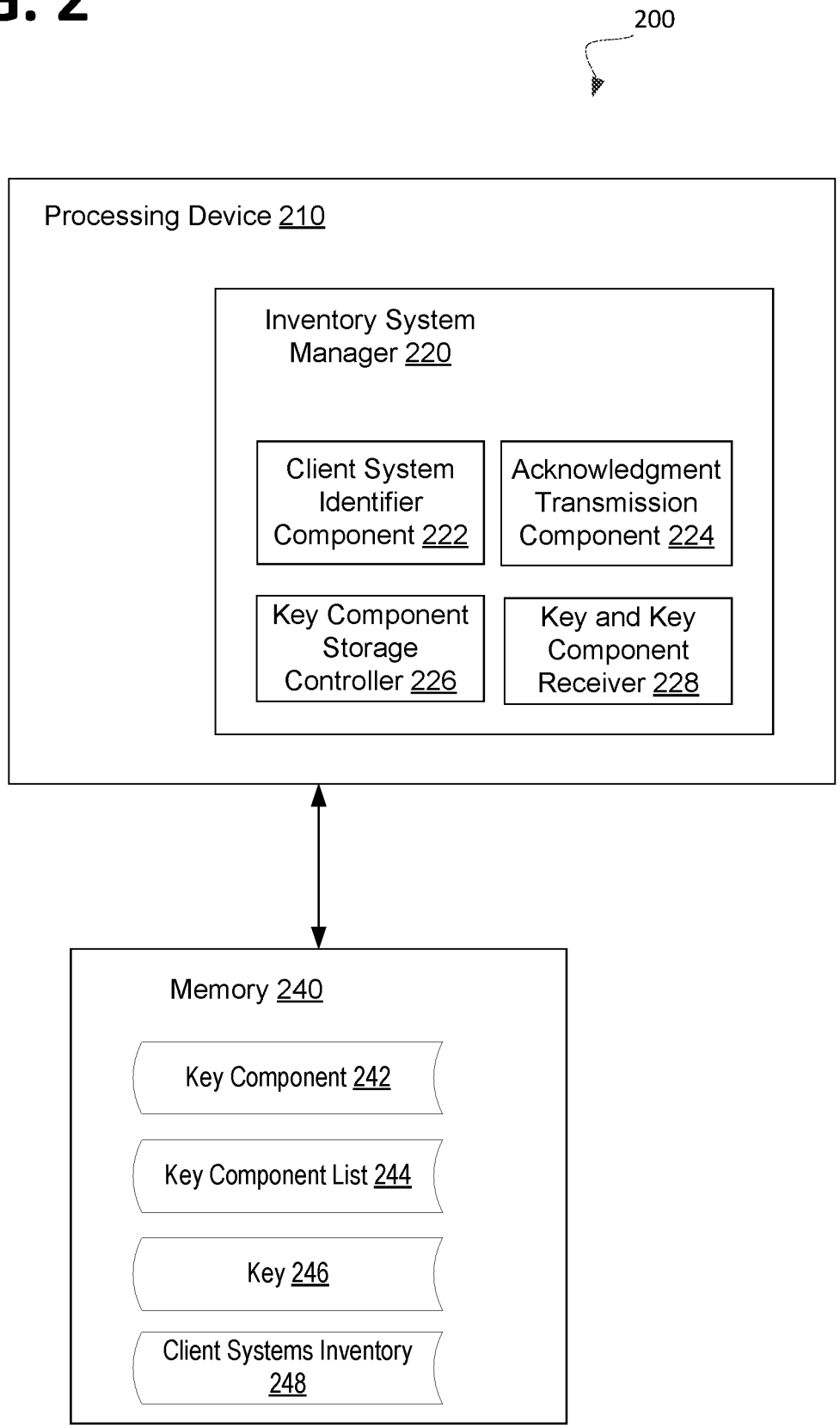
FIG. 2 depicts a system diagram of an example inventory system manager according to one implementation.

FIG. 2 is an example system 200 implementing an inventory system manager 220, according to implementations of the disclosure. As shown in FIG. 2, the system 200 may comprise an inventory system manager 220 executing on a processing device 210 and a memory 240. In one implementation, inventory system manager 220 is the same as inventory system manager 132 described with respect to FIG. 1. Inventory system manager 220 may include a client system identifier component 222, an acknowledgment transmission component 224, a key component storage controller 226, and a key and key component receiver 228. Memory 240 may store a key component 242, a key component list 244, a key 246, and a client systems inventory 248.

The client system identifier component 222 may identify a client system using a key received in a communication from the client system. The acknowledgment transmission component 224 may transmit an acknowledgment to the client system that a key component was received from the client system. The acknowledgment may include the key received and the key component received, thus allowing the client system to confirm that the correct key component was received by the inventory system manager 220. The key component storage controller 226 may store a key component 242 in memory 240 after receipt of the key component 242 has been acknowledged, or after the client device indicates that the acknowledgement included the correct key component. Key and key component receiver 228 may receive and identify the key and key component sent from the client device.

The key component 242 may be the key component received from the client system. The key component list 244 may be a list of previous key components used to identify the client system. Key 246 may be the key received from client system that is used to identify the client system. Client systems inventory 248 may be an inventory database of all client systems executing within a computing environment. Although depicted separately, the key 246 and key component 242 may be stored as part of the key component list 244. The key 246, the key component 242, and the key component list 244 may also be stored as part of the client systems inventory 248. For example, key component 242 may be appended to the key component list 244 when the key component storage controller 226 stores the key component 242. The key 246 may comprise the key component list 244, the key component 242, or any subset of the key component 242 and the key components of the key component list 244.

Figure 3:
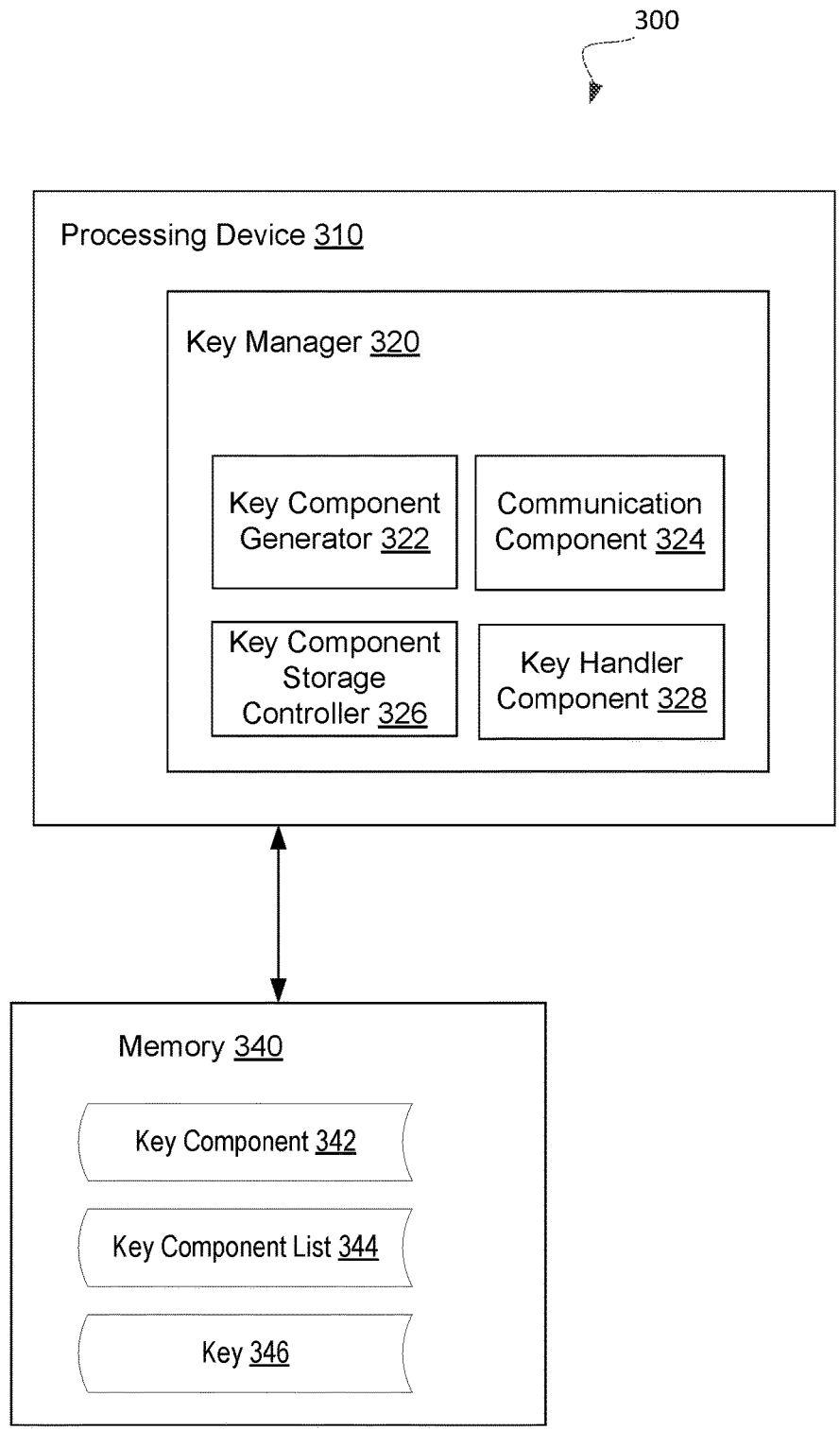
FIG. 3 depicts a system diagram of an example key manager according to one implementation.

FIG. 3 is an example system 300 implementing a key manager 320, according to implementations of the disclosure. The system 300 may comprise a key manager 320 executing on a processing device 310 and a memory 340. In one implementation, key manager 320 is the same as key manager 116A-B described with respect to FIG. 1. Key manager 320 may execute on a client system that is identified as a component in a systems inventory. Key manager 320 may comprise a key component generator 322, a communication component 324, a key component storage controller 326, and a key handler component 328. Memory 340 may store a key component 342, a key component list 344, and a key 346.

Key component generator 322 may generate a random string of alphanumeric characters called a key component. The communication component 324 may transmit a communication including a key and a key component to an inventory server, such as inventory server 130 as described with FIG. 1. The communication component 324 may also receive an acknowledgment from the inventory server. The key component storage controller 326 may store a key component 342 as part of a new key 346, stored in memory 340, to identify the client system. Key handler component 328 may identify the key used to identify the client system before and after storing the key component as the new key 346.

Key component 342 may be the key component that has been randomly-generated by the key component generator 322. The key component list 344 may be a list of key components previously used to identify the client system. The key component 342 may be appended to the key component list 344 after the communication component 324 receives an acknowledgment from the inventory server. Key 346 may be the key that is used by the inventory server to identify the client system. Although depicted separately, the key 346 and key component 342 may be stored as part of the key component list 344. For example, key component 342 may be appended to the key component list 344 when the key component storage controller 326 stores the key component 342. The key 346 may comprise the key component list 344, the key component 342, or any subset of the key component 342 and the key components of the key component list 344.

FIG. 4A is an example inventory database 450 according to an implementation of the disclosure. Inventory database 450 may include any data structure that can be used to store data associated with a client system. As shown in FIG. 4A, a key 452 comprising a string of characters may be used as a unique identifier of a client system, such as a virtual machine. Inventory database 450 may store additional data associated with the identified machine, such as identification of a user 454, a host 456, power state (not shown), and the IP address (not shown) of the client system, along with any other properties of the identified machine.

In an inventory system database 450, a rolling key may be used to uniquely identify each virtual machine, even if a virtual machine is cloned. Inventory system database 450 may be located on a server, such as the inventory server 130 as described with respect to FIG. 1. For example, if the machine associated with the key "ABC123" were cloned, the key stored by both the original machine and the clone would be "ABC123." In such a case, each virtual machine would be associated with the same record in the inventory system database 450, rather than being uniquely identified. However, in accordance with aspects of this disclosure, after the virtual machine is cloned, each virtual machine may communicate with the server on which the inventory system database 450 resides. Each virtual machine may generate a random key component that differs from other random key components of other virtual machines. When a first virtual machine communicates with the server, it is identified as the machine with the key "ABC123." However, the key is subsequently replaced by the key component that was randomly-generated by that machine (e.g., "CDD243"). When the second virtual machine communicates with the server, the "ABC123" key is no longer associated with a virtual machine in the inventory database 450 and the server then has to create a new record for the second virtual machine and append the key component that was randomly-generated by the second machine to that record (e.g., "HYE986").

In another example, FIG. 4A depicts virtual machines 410, 420, 430, and 440. Virtual machine 410 may be cloned into one or more other virtual machines 420, 430, and 440. Virtual machines 410, 420, 430, and 440 may each initially be identified by the same key. After virtual machine 410 communicates with the server it is identified by a new unique key (e.g., "ABC123"). Furthermore, after each of the virtual machines 420, 430, and 440 communicate with the server, they are each identified by a new unique key. For example, virtual machine 420 may be identified by key "BDA242," virtual machine 430 may be identified by key "CFA892," and virtual machine 440 may be identified by key "DFF798." In this way, each of the cloned virtual machines may be identified by a unique key after communication with the server.

FIG. 4B depicts an example key component list 460, according to an implementation of the disclosure. The key component list 460 may comprise a newly-generated key component 462 and one or more key components 464A-C that have been previously generated and used to identify a client system. The key component list 460, or a subset of the key components 462 and 464A-C in the key component list 460, may be the key used to identify the client system. In some implementations, the key component list 460 may be stored on both the client system and an inventory server.

In one example, the most recent key component 462 appended to the key component list 460 (e.g. "ABC123") is the key used by the inventory server to identify the client system. In another example, the two most recent key components (e.g., 462 and 464A) appended to the key component list 460 (e.g., "ABC123:HKD386") is the key used by the inventory server to identify the client system. In one more example, all key components (e.g., 462 and 464A-C) of the key component list 460 are used as the key to identify the client system. The key component list 460 may include any number of key components. In some instances, the key component list 460 may be of a specific length. After that length is reached, when a new key component (e.g., 462) is appended to the key component list 460, the oldest key component (e.g., 464C) may be removed from the key component list 460. The client system and inventory server may also store a hash of the key component list to verify that each of the key components appended to the key component list were previously used to identify the client system.

Figure 5A:
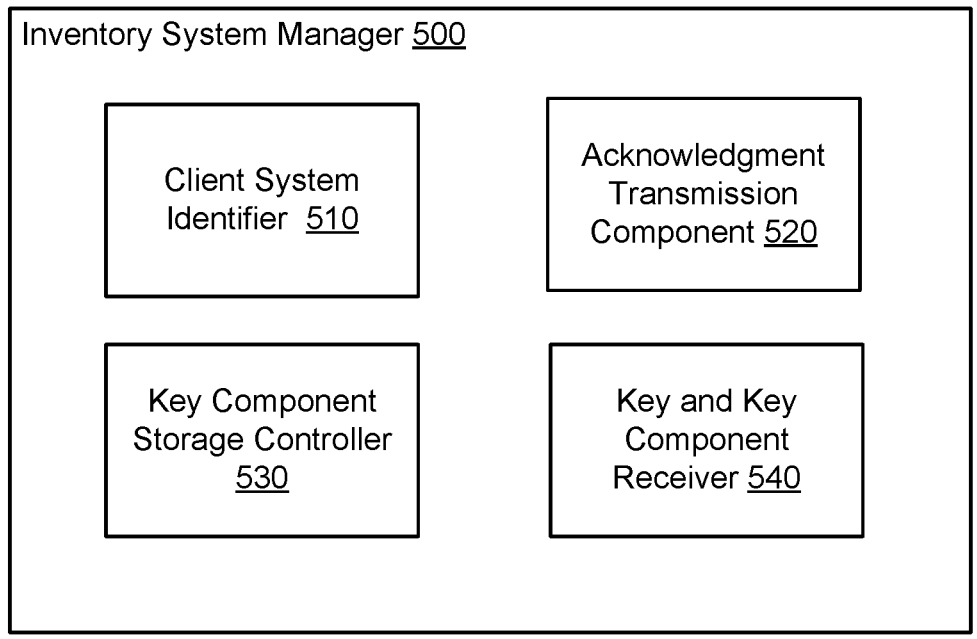
FIG. 5A depicts a component diagram of an example inventory system manager according to one implementation.

FIG. 5A depicts a component diagram of an example inventory system manager 500, according to one implementation. As shown in FIG. 5A, inventory system manager 500 may include a client system identifier 510, an acknowledgment transmission component 520, a key component storage controller 530, and a key and key component receiver 540. In one implementation, inventory system manager 500 is the same as inventory system manager 132 described with respect to FIG. 1.

The client system identifier 510 may identify a client system using a key received in a communication from the client system. The acknowledgment transmission component 520 may transmit an acknowledgment to the client system that a key component was received from the client system. The acknowledgment may include the key received and the key component received, allowing the client system to confirm that the correct key component was received by the inventory system manager 500. The key component storage controller 530 may store a key component in the inventory database, or any such data store. The key component may be stored after receipt of the key component has been acknowledged, or after the client device indicates that the acknowledgement included the correct key component. Key and key component receiver 540 may receive and identify the key and key component sent from the client device.

Figure 5B:
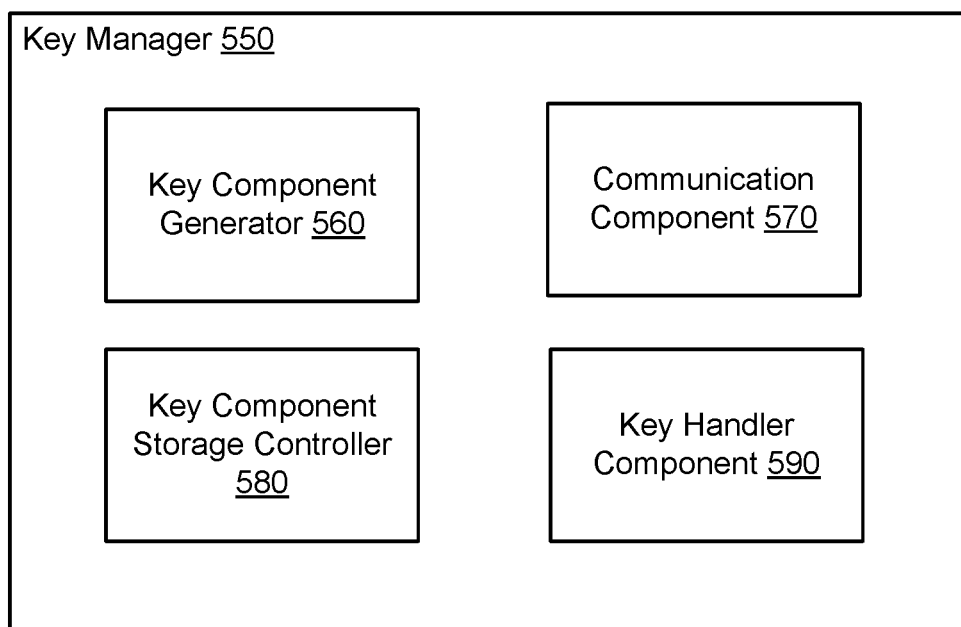
FIG. 5B depicts a component diagram of an example key manager according to one implementation.

FIG. 5B depicts a component diagram of an example key manager 550, according to one implementation. Key manager 550 may comprise a key component generator 560, a communication component 570, a key component storage controller 580, and a key handler component 590. In one implementation, key manager 550 is the same as key manager 116A-B described with respect to FIG. 1.

Key component generator 560 may generate a random string of alphanumeric characters called a key component. The communication component 570 may transmit a communication comprising a key and a key component to an inventory server, as well as receive an acknowledgment from the inventory server that the inventory server received the key component. The key component storage controller 580 may store the key component as part of a new key to identify the client system. Key handler component 590 may identify the key used to identify the client system before and after storing the key component as part of the new key.

Figure 6A:
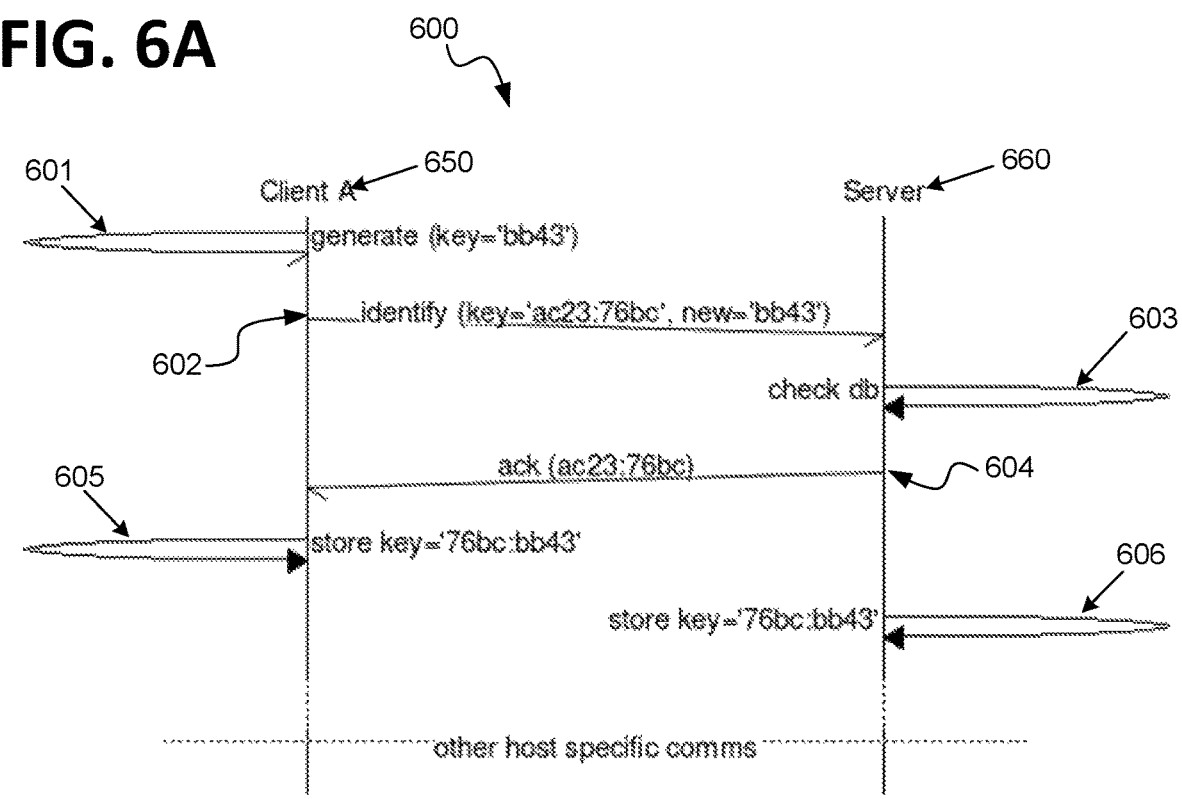
FIG. 6A depicts an illustrative example of a rolling key being used when a client system already exists and is identifiable by the inventory server according to one implementation.

FIG. 6A depicts a flow diagram illustrating an example process 600 implementing a rolling key between a client 650 and a server 660, according to an implementation of the disclosure. In one implementation, client 650 may be the virtual machine 114A-B as described with respect to FIG. 1. Server 660 may be the inventory server 130 as described with respect to FIG. 1. As depicted in FIG. 6A, at step 601 client 650 may generate a key component. The key component may comprise a random string of characters (e.g., "bb43"). In step 602, client 650 may transmit a communication including the key component ("bb43") and a key identifying the client 650 ("ac23:76bc") to the server 660. In step 603, the server 660 may identify the client 650 in an inventory database. In step 604, server 660 may send an acknowledgment to the client 650 indicating that the server 660 received the key component. The acknowledgment may include the key component. In step 605, the client may store the key component after receiving the acknowledgment from step 604. Storing the key component may include appending the key component to a key component list (e.g., "ac23:76bc:bb43" not depicted in figure). Storing the key component may include removing the least recently used key component from the key component list (e.g., "76bc:bb43"). The client 650 may store the key component in response to determining that the key component included in the acknowledgment is the same key component generated by the client 650 in step 601. In step 606, the server 660 may store the key component. The server may store the key component in response to the client 650 indicating that the client 650 stored the key component.

Figure 6B:
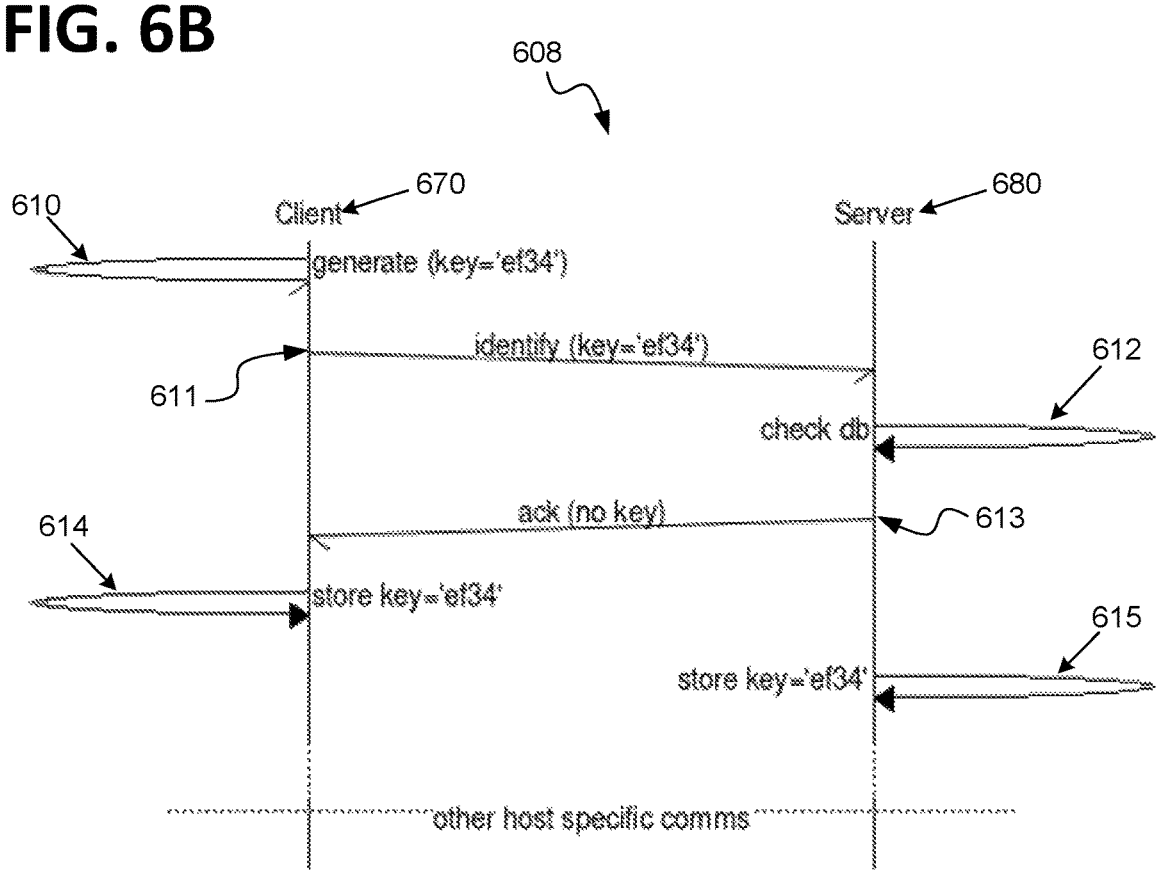
FIG. 6B depicts an illustrative example of a rolling key being used when a new client system communicates with the inventory server according to one implementation.

FIG. 6B depicts a flow diagram illustrating an example process 608 implementing a rolling key between a new client 670 without a key and a server 680, according to an implementation of the disclosure. In one implementation, client 670 may be the virtual machine 114A-B as described with respect to FIG. 1. Server 680 may be the inventory server 130 as described with respect to FIG. 1. In step 610, client 670 may generate a key component. The key component may comprise a random string of characters (e.g., "ef34"). In step 611, client 670 may transmit a communication comprising the key component ("ef34") to the server 680. In step 612, the server 680 may search an inventory database to determine if the client 670 is in the database. The server 680 may determine that the client 670 is not in the inventory database. In step 613, server 680 may send an acknowledgment to the client 670 indicating that the server 680 received the key component. The acknowledgment may include the key component and an indication that the client 670 was not identified in the inventory database. In step 614, the client 670 may store the key component after receiving the acknowledgment from step 613. Storing the key component may include creating a new key component list and appending the key component to the key component list. The client 670 may store the key component in response to determining that the key component included in the acknowledgment is the same key component generated by the client 670 in step 610. In step 615, the server 680 may store the key component. The server 680 may store the key component in response to the client 670 indicating that the client 670 stored the key component.

Figure 7:
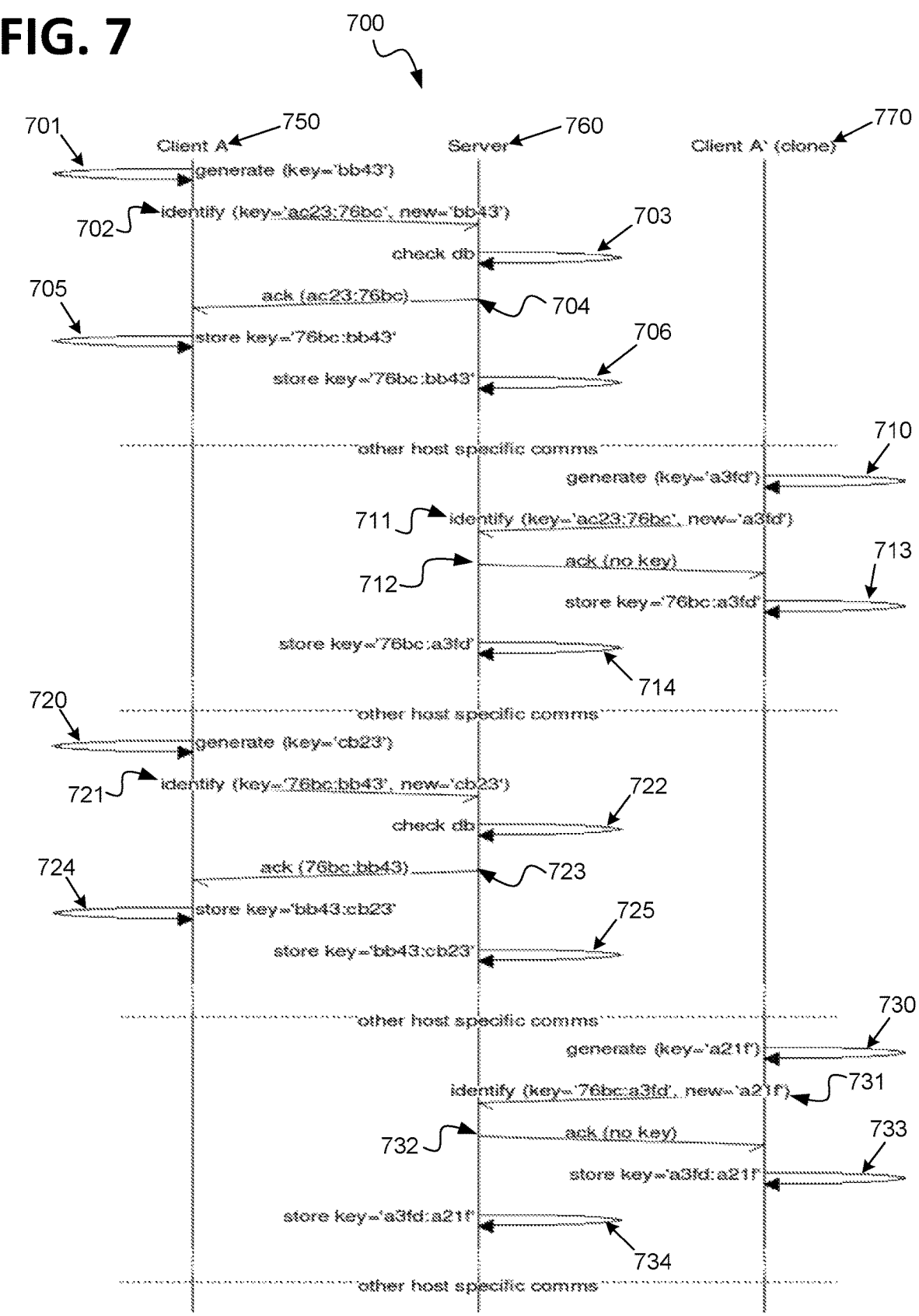
FIG. 7 depicts an illustrative example of a rolling key being used to uniquely identify a cloned system from the original system according to one implementation.

FIG. 7 depicts a flowchart of an example process 700 implementing a rolling key to uniquely identify by a server 760 a first client 750 (client A) and a second client 770 (client A'), which is a clone of the first client 750, according to an implementation of the disclosure. In one implementation, the first client 750, the second client 770, and the server 760 may be the same as virtual machine 114A, virtual machine 114B, and inventory server 130 respectively, as described with respect to FIG. 1. Before process 700 begins the first client 750 may be cloned to create the second client 770. Cloning may refer to copying the disk of one computer system to initialize a new computer system that is identical, or nearly identical, to the first computer system.

In step 701, the first client 750 may generate a key component. The key component may comprise a random string of characters (e.g., "bb43"). In step 702, the first client 750 may transmit a communication including the key component ("bb43") and a key identifying the first client 750 ("ac23:76bc") to the server 760. In step 703, the server 760 may check the inventory database to determine if the first client 750 is in the inventory database. The server 760 may identify the first client 750 if it is in the inventory database. In step 704, server 760 may send an acknowledgment to the first client 750 indicating that the server 760 received the key component. The acknowledgment may include the key component. In step 705, the first client 750 may store the key component after receiving the acknowledgment from step 704. In one implementation, storing the key component may include appending the key component to a key component list (e.g., "ac23:76bc:bb43"—not depicted in figure). In one implementation, storing the key component may include removing the least recently used key component from the key component list (e.g., "76bc:bb43"). The first client 750 may store the key component in response to determining that the key component included in the acknowledgment is the same key component generated by the first client 750 in step 701. In step 706, the server 760 may store the key component. The server 760 may store the key component in response to the first client 750 indicating that the first client 750 stored the key component.

In step 710, the second client 770 may generate a key component. The key component may comprise a random string of characters (e.g., "a3fd"). In step 711, the second client 770 may transmit a communication including the key component ("a3fd") and a key ("ac23:76bc") to the server 760. In the current example of process 700, the server 760 would not be able to identify the second client 770 based on the key received because that key was updated when the first client 750 communicated with the server 760. At step 712, the server 760 may transmit an acknowledgment to the second client 770 that the key component was received and that the server 760 was unable to identify the second client 770 in the inventory database. In step 713, the second client 770 may receive the acknowledgment and store the key component as part of the new key to identify the second client 770. The second client 770 may send an indication to the server 760 that the acknowledgment included the same key component generated by the second client 770 in step 710. In step 714, the server 760 may store the key component. The server 760 may store the key component in response to the second client 770 indicating that the second client 770 stored the key component. The same process may be repeated by each client 750, 770, continuing to generate unique key components to cause each client 750, 770 to be uniquely identified by the inventory server.

Figure 8:
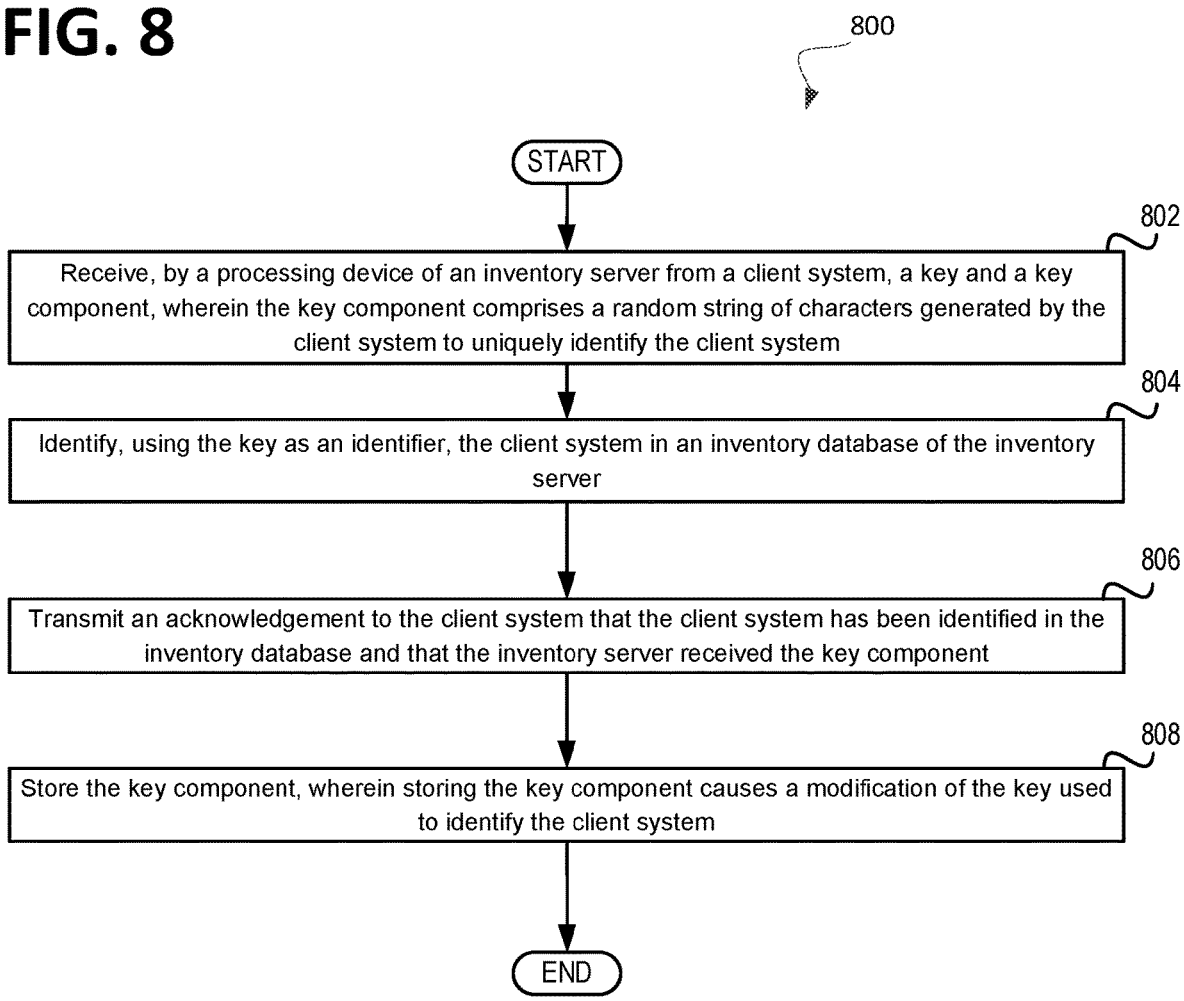
FIG. 8 depicts a flow diagram of implementing a rolling key on a server to identify systems inventories, in accordance with one or more aspects of the disclosure.
Figure 9:
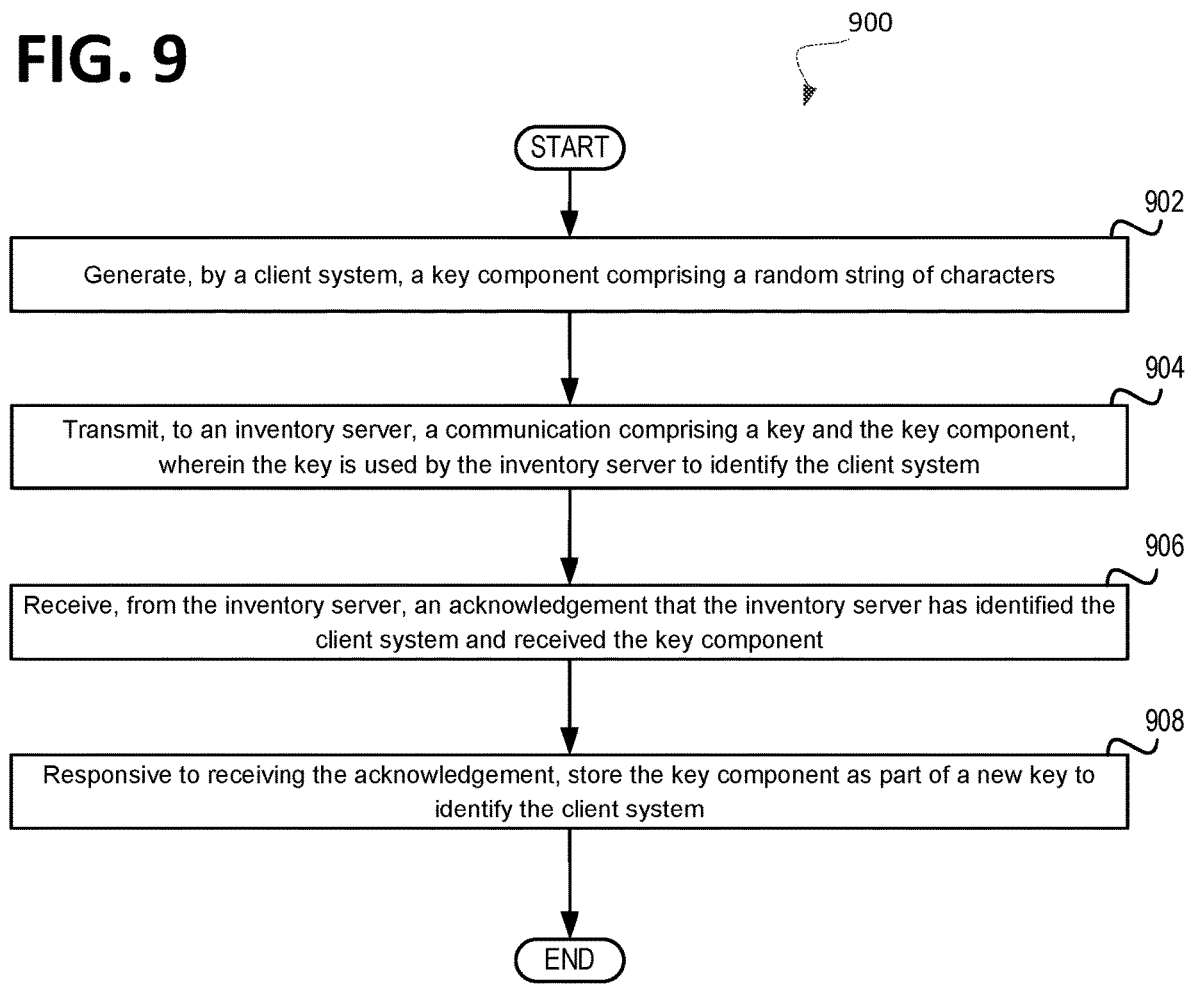
FIG. 9 depicts a flow diagram of implementing a rolling key on a client system to identify systems inventories, in accordance with one or more aspects of the disclosure.
Figure 10:
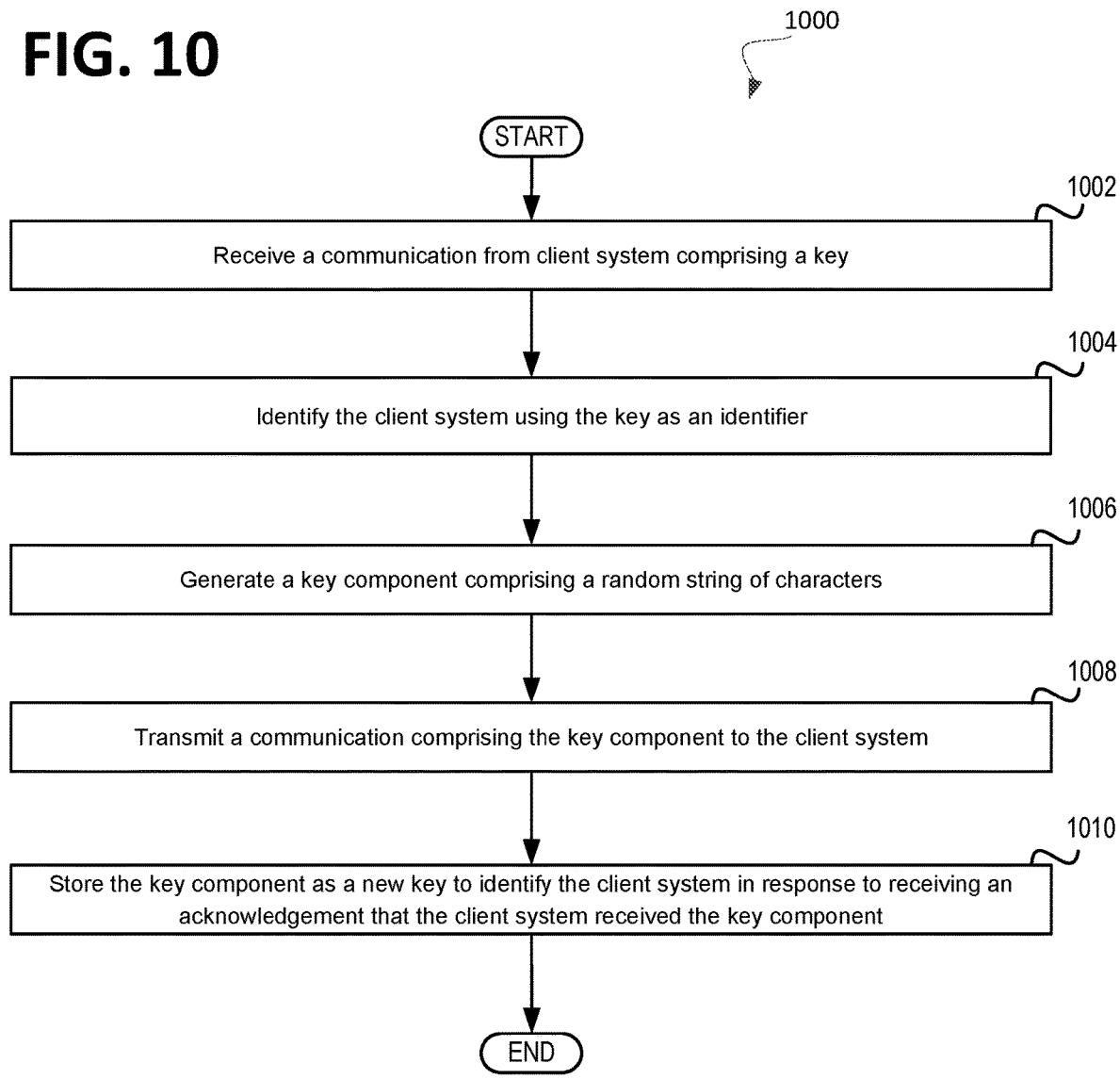
FIG. 10 depicts an illustrative example of a rolling key to uniquely identify a client system according to one implementation.

FIGS. 8, 9, and 10 depict flow diagrams of example methods 800, 900, and 1000 for using a rolling key to identify a client system according to various implementations of the disclosure. Method 800 illustrates an example process flow of using a rolling key to uniquely identify a client system by an inventory server. Method 900 illustrates an example process flow of a client system using a rolling key. Method 1000 illustrates an example process flow of using a rolling key generated by an inventory server to uniquely identify client systems.

For simplicity of explanation, the methods of this disclosure are depicted and described in a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, the methods disclosed in this specification are capable of being stored on an article of manufacture to facilitate transporting and transferring such methods to computing devices. The term "article of manufacture," as used herein, is intended to encompass a computer program accessible from any computer-readable storage device or memory page media.

Referring to FIG. 8, method 800 may be performed by a processing device of an inventory server. In one implementation, the inventory server is the inventory server 130 as described with respect to FIG. 1. At block 802, a key and key component may be received from a client system, wherein the key component is a random string of characters generated by the client system to uniquely identify the client system. In one implementation, the client system is the virtual machine 114A-B as described with respect to FIG. 1. The key may be a key component or a combination of key components of a key component list. At block 804, the client system may be identified using the key provided by the client system. The client system may be identified in an inventory database of the inventory server using the key as an identifier. In one implementation, the inventory database is the inventory database 134 as described with respect to FIG. 1. At block 806, an acknowledgment may be transmitted to the client system indicating that the client system has been identified in the inventory database and that the inventory server received the key component. The acknowledgment may include the key component. The client system may store the key component as part of a new key used to identify the client system in response to determining that the key component included in the acknowledgement is the same key component that was originally generated by the client system. At block 808, the key component may be stored. Storing the key component may include replacing or causing a modification of the previous key used to identify the client system. In response to the key component being stored, the client system is now identified by a new unique key.

Referring to FIG. 9, method 900 may be performed by a client processing device. At block 902, a key component comprising a random string of alphanumeric characters may be generated by a client system. In one implementation, the client system may be virtual machine 114A-B as described with respect to FIG. 1. At block 904, a communication including a key and the generated key component may be transmitted to an inventory server from the client system. In one implementation, the inventory server is the inventory server 130 as described with respect to FIG. 1. The key may be used by the inventory server to identify the client system in an inventory database. At block 906, an acknowledgement may be received from the inventory server indicating that the inventory server received the key component. The acknowledgment may indicate that the inventory server has identified the client system in the inventory database and that the inventory server received the key component. At block 908, the client system may store the key component as part of a new key to identify the client system after receiving the acknowledgment. The client system may store the key component in response to determining that the key component received in the acknowledgement is the same key component generated at block 902.

Referring to FIG. 10, method 1000 may be performed by a processing device of an inventory server. In one implementation, the inventory server may be the inventory server 130 as described with respect to FIG. 1. At block 1002, a communication from a client system is received. In one implementation, the client system is virtual machine 114A-B as described with respect to FIG. 1. The communication may include a key used to identify the client system. At block 1004, the client system is identified using the key included in the communication. The inventory server may identify the client system from an inventory database of client systems using the key as an identifier. At block 1006, a key component comprising a random sting of characters may be generated by the inventory server. A random key component may be generated each time a client system communicates with the server. At block 1008, a communication comprising the key component may be transmitted to the client system. The client system may store the key component as part of a new key used to identify the client system. At block 1010, the inventory server may store the key component as part of the new key used to identify the client system. The inventory server may store the key component in response to receiving an acknowledgment from the client system that the client system received the key component. The inventory server may send an indication to the client system that the acknowledgment included the same key component as the key component generated at block 1006.

Figure 11:
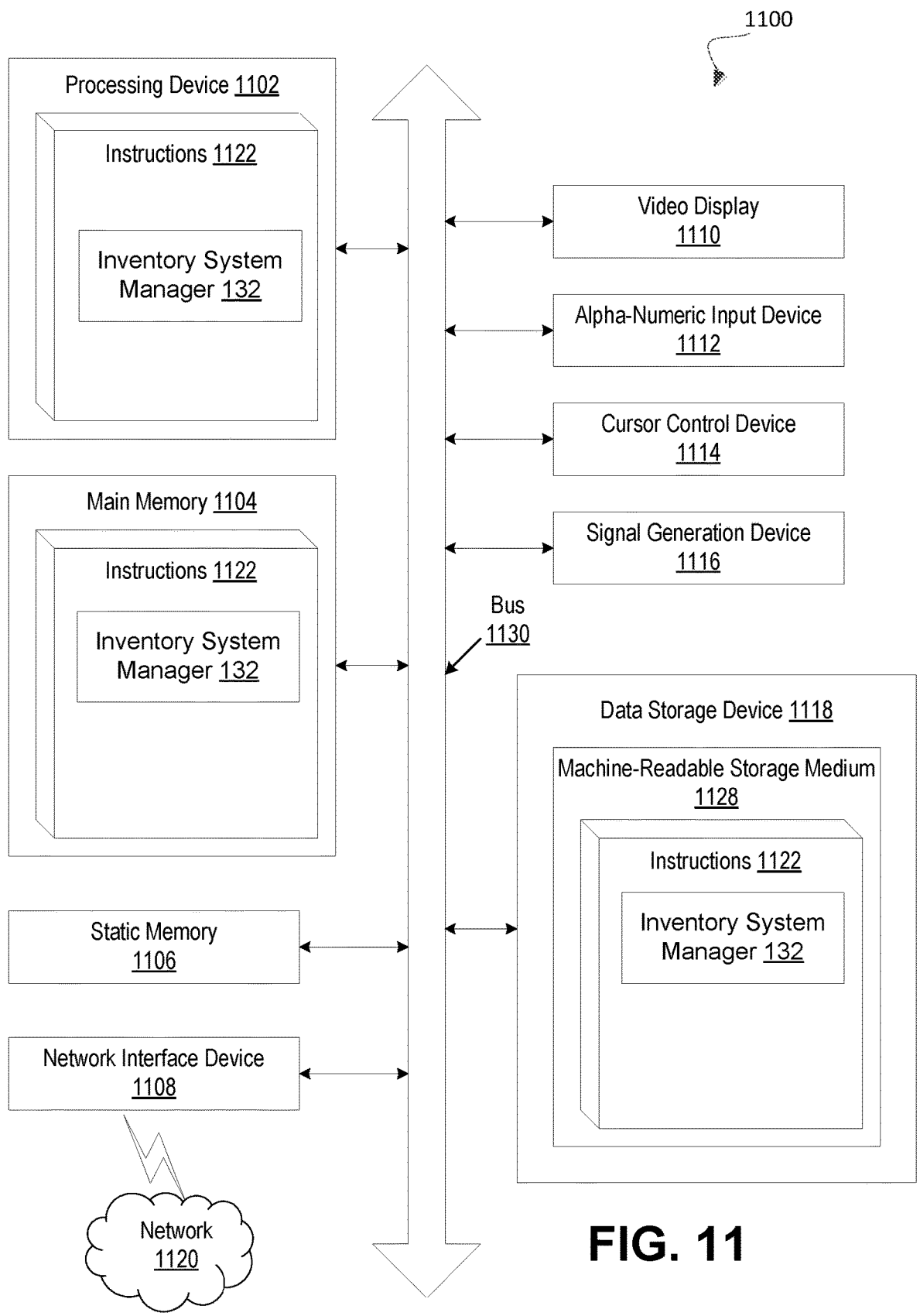
FIG. 11 depicts a block diagram of an illustrative computer system operating in accordance with one implementation.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130. The processing device 1102 may be operatively coupled with the main memory 1104, static memory 1106, and/or the data storage device 1118.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-readable storage medium 1128 (also known as a computer-readable medium) on which is stored one or more sets of instructions or software 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1122 include instructions for an inventory system manager (e.g., inventory system manager 132 of FIG. 1) and/or a software library containing methods that call inventory system manager. While the machine-readable storage medium 1128 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Other computer system designs and configurations may also be suitable to implement the system and methods described herein. The following examples illustrate various implementations in accordance with one or more aspects of the present disclosure.

Example 1 is a method including receiving, by a processing device of an inventory server from a client system, a key and a key component, wherein the key component comprises a random string of characters generated by the client system to uniquely identify the client system, identifying, using the key as an identifier, the client system in an inventory database of the inventory server, transmitting an acknowledgement to the client system that the client system has been identified in the inventory database and that the inventory server received the key component, the acknowledgement to cause the client system to store the key component as part of a new key used to identify the client system, and storing the key component, wherein storing the key component causes a modification of the key used to identify the client system.

Example 2 is the method of example 1, wherein the key received from the client system comprises a string of characters stored at both the client system and the inventory server to identify the client system upon communication of the client system with the inventory server.

Example 3 is the method of example 1, wherein the client system comprises a virtual machine executing on a physical host machine and wherein the inventory server comprises an inventory system to maintain an inventory of client systems associated with a computing environment.

Example 4 is the method of example 3, wherein the inventory system of the inventory server comprises the inventory database, and wherein the inventory system identifies the client system in view of a record stored in the database, the record comprising an association between the key and the client system.

Example 5 is the method of example 3, wherein identifying the client system using the key comprises: comparing the key to a list of keys in the inventory database, wherein each key in the list of keys is associated with one of a plurality of client systems; and identifying the client system associated with the key in the inventory database.

Example 6 is the method of example 1, wherein storing the key component comprises appending the key component to a key component list and removing a least recently used key component from the key component list.

Example 7 is the method of example 6, wherein the key component list comprises one or more key components and wherein the key used to identify the client system comprises a subset of the one or more key components of the key component list.

Example 8 is the method of example 1, wherein the acknowledgment to the client system comprises the key component and wherein the key component uniquely identifies the client system from other systems generated from a single disk.

Example 9 is the method of example 7 that further includes storing a hash of the key component list, the hash utilized to verify that each key component of the key component list was a key previously used to identify the client system.

Example 10 is the method of example 8, wherein the key component is stored in response to receiving an indication from the client system that the key component received by the client system in the acknowledgment is the key component generated by the client system.

Example 11 is the method of example 7, wherein the client system executes a key management component, wherein the key management component performs functions corresponding to management of the key, the key component, and the key component list associated with the client system.

Example 12 is a system comprising a memory, a processing device operatively coupled to the memory, the processing device to generate, by a client system, a key component comprising a random string of characters, transmit, to an inventory server, a communication comprising a key and the key component, wherein the key is used by the inventory server to identify the client system, receive, from the inventory server, an acknowledgment that the client system has been identified in an inventory database of the inventory server and that the inventory server received the key component, and responsive to receiving the acknowledgment, store the key component as part of a new key to identify the client system.

Example 13 is the system of example 12, wherein the client system comprises a virtual machine executing on a physical host machine and wherein the inventory server comprises an inventory system to maintain an inventory of client systems associated with a computing environment.

Example 14 is the system of example 13, wherein the inventory system comprises the inventory database, wherein the inventory system identifies the client system in view of a record stored in the inventory database, the record comprising an association between the key and the client system.

Example 15 is the system of example 12, wherein the key transmitted to the inventory server comprises a string of characters stored at both the client system and the inventory server to identify the client system upon communication of the client system with the inventory server.

Example 16 is the system of example 12, wherein storing the key component comprises causing the processor to append the key component to a key component data structure and remove a least recently used key component from the key component data structure.

Example 17 is the system of example 16, wherein the processing device is further to store a hash of the key component data structure, the hash utilized to verify that each key component of the key component data structure was a key previously used to identify the client system.

Example 18 is a non-transitory machine-readable storage medium including instructions that, when accessed by a processing device, cause the processing device to receive, by the processing device of an inventory server from a first client system, a key and a first key component, wherein the first key component comprises a random string of characters generated by the first client system to uniquely identify the first client system from a second client system, identify, using the key as an identifier, the first client system in an inventory database of the inventory server, transmit an acknowledgement to the first client system that the first client system has been identified in the inventory database and that the inventory server received the first key component, the acknowledgement to cause the first client system to store the first key component as part of a new key used to identify the first client system, and store the first key component, wherein storing the first key component causes a modification of the key used to identify the first client system.

Example 19 is the storage medium of example 18, wherein the processing device is further caused to receive, by the processing device of the inventory server from a second client system, the key and a second key component, wherein the second key component comprises a random string of characters generated by the second client system to uniquely identify the second client system, transmit an acknowledgement to the second client system that the inventory server received the second key component, the acknowledgment to cause the second client system to store the second key component as part of a new key used to identify the second client system.

Example 20 is the storage medium of example 19, wherein the acknowledgment transmitted to the second client system comprises an indication that the key received by the server is not associated with a client system in the inventory database, and wherein the second client system is generated as a clone of the first client system.

Example 21 is the storage medium of example 19, wherein the first and second client systems each comprise a virtual machine executing on a physical host machine and wherein the inventory server comprises an inventory system to maintain an inventory of client systems associated with a computing environment.

Example 22 is a method that includes receiving, by an inventory system from a client system, a key and a key component, wherein the key component comprises a random string of characters generated by the client system, transmitting an acknowledgement to the client system that the key component was received by the inventory system, the acknowledgement to cause the client system to store the key component as part of a new key used to identify the client system, and storing the key component as part of the new key to identify the client system.

Example 23 is the method of example 22, wherein storing the key component as part of the new key to identify the client system comprises creating a new record in an inventory database of the inventory server and associating the key component with the client system in the new record.

Example 24 is the method of example 22, wherein the acknowledgement comprises an indication that there is not a key associated with the client system in the inventory system.

Example 25 is a method that includes receiving, at a server, a communication from a client system, the communication comprising a key, identifying the client system using the key, generating, by the server, a key component comprising a random string of characters, transmitting a communication comprising the key component to the client system, and responsive to receiving an acknowledgment that the client system received the key component, storing the key component as a new key to identify the client system.

Example 26 is the method of example 25 that further includes sending a confirmation to the client system that the key component received in the acknowledgement matches the key component generated by the server, the confirmation causing the client system to store the key component as the new key to identify the client system.

Example 27 is the method of example 25, wherein storing the key component comprises appending the key component to a key component data structure and removing a least recently used key component from the key component data structure.

Example 28 is the method of example 27, wherein the key component data structure comprises a hash of a key component list.

Example 29 is the method of example 28, wherein the key component list comprises a list of key components previously used to identify the client system.

Example 30 is an apparatus comprising means for generating, by a client system, a key component comprising a random string of characters to uniquely identify the client system from other client systems, means for transmitting a communication comprising a key and the key component to an inventory server, means for receiving from the inventory server an acknowledgment that the inventory server received the key component, and means for, responsive to receiving the acknowledgment, storing the key component as part of a new key to identify the client system.

Example 31 is the apparatus of example 30 further comprising means for appending the key component to a key component list and means for removing a least recently used key component from the key component list.

What is claimed is:

1. A method comprising:
   receiving, by a processing device of an inventory server from a client system, a key and a key component, wherein the key component comprises a random string of characters generated by the client system to uniquely identify the client system;
   identifying, using the key as an identifier, the client system in an inventory database of the inventory server;
   transmitting an acknowledgement to the client system that the client system has been identified in the inventory database and that the inventory server received the key component, the acknowledgement to cause the client system to store the key component as part of a new key used to identify the client system; and
   storing the key component, wherein storing the key component causes a modification of the key used to identify the client system.

2. The method of claim 1, wherein the key received from the client system comprises a string of characters stored at both the client system and the inventory server to identify the client system upon communication of the client system with the inventory server.

3. The method of claim 1, wherein the client system comprises a virtual machine executing on a physical host machine and wherein the inventory server comprises an inventory system to maintain an inventory of client systems associated with a computing environment.

4. The method of claim 3, wherein the inventory system of the inventory server comprises the inventory database, wherein the inventory system identifies the client system in view of a record stored in the inventory database, the record comprising an association between the key and the client system.

5. The method of claim 4 further comprising:
appending the key component to a key component list; and
removing a least recently used key component from the key component list.

6. The method of claim 5, wherein the key component list comprises one or more key components and wherein the key used to identify the client system comprises a subset of the one or more key components of the key component list.

7. The method of claim 1, wherein the acknowledgment to the client system comprises the key component and wherein the new key uniquely identifies the client system from other systems generated from a single disk.

8. The method of claim 7 further comprising:
storing a hash of the key component list, the hash utilized to verify that each key component of the key component list was a key previously used to identify the client system.

9. The method of claim 7, wherein the key component is stored in response to receiving an indication from the client system that the key component received by the client system in the acknowledgment is the key component generated by the client system.

10. The method of claim 7, wherein the client system executes a key management component, wherein the key management component performs functions corresponding to management of the key, the key component, and the key component list associated with the client system.

11. A system comprising:
a memory;
a processing device operatively coupled to the memory, the processing device to:
generate, by a client system, a key component comprising a random string of characters;
transmit, to an inventory server, a communication comprising a key and the key component, wherein the key is used as an identifier to identify the client system in an inventory database of the inventory server;
receive, from the inventory server, an acknowledgment that the client system has been identified in the inventory database and that the inventory server received the key component; and
responsive to receiving the acknowledgment, store the key component as part of a new key to identify the client system.

12. The system of claim 11, wherein the client system comprises a virtual machine executing on a physical host machine and wherein the inventory server comprises an inventory system to maintain an inventory of client systems associated with a computing environment.

13. The system of claim 12, wherein the inventory system of the inventory server comprises the inventory database, wherein the inventory system identifies the client system in view of a record stored in the inventory database, the record comprising an association between the key and the client system.

14. The system of claim 11, wherein the key transmitted to the inventory server comprises a string of characters stored at both the client system and the inventory server to identify the client system upon communication of the client system with the inventory server.

15. The system of claim 11, wherein storing the key component comprises causing the processor to:
append the key component to a key component data structure; and
remove a least recently used key component from the key component data structure.

16. The system of claim 15, wherein the processing device is further to:
store a hash of the key component data structure, the hash utilized to verify that each key component of the key component list was previously a key used to identify the client system.

17. A non-transitory machine-readable storage medium including instructions that, when accessed by a processing device, cause the processing device to:
receive, by the processing device of an inventory server from a first client system, a key and a first key component, wherein the first key component comprises a random string of characters generated by the first client system to uniquely identify the first client system from a second client system;
identify, using the key as an identifier, the first client system in an inventory database of the inventory server;
transmit an acknowledgement to the first client system that the first client system has been identified in the inventory database and that the inventory server received the first key component, the acknowledgement to cause the first client system to store the first key component as part of a new key used to identify the first client system; and
store the first key component, wherein storing the first key component causes a modification of the key used to identify the first client system.

18. The non-transitory machine-readable storage medium of claim 17, wherein the processing device is further caused to:
receive, by the processing device of the inventory server from the second client system, the key and a second key component, wherein the second key component comprises a random string of characters generated by the second client system to uniquely identify the second client system;
transmit an acknowledgement to the second client system that the inventory server received the second key component, the acknowledgment to cause the second client system to store the second key component as part of a new key used to identify the second client system.

19. The non-transitory machine-readable storage medium of claim 18, wherein the acknowledgment transmitted to the second client system comprises an indication that the key received by the server is not associated with a client system in the inventory database, and wherein the second client system is generated as a clone of the first client system.

20. The non-transitory machine-readable storage medium of claim 18, wherein the first and second client systems each comprise a virtual machine executing on a physical host machine and wherein the inventory server comprises an inventory system to maintain an inventory of client systems associated with a computing environment.

* * * * *